UNITED STATES PATENT OFFICE.

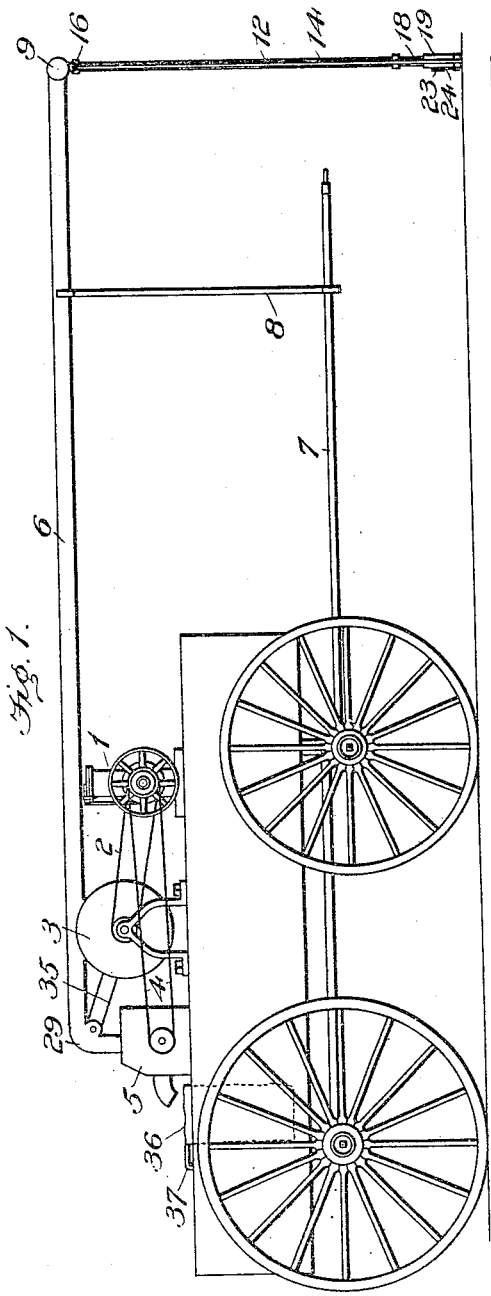

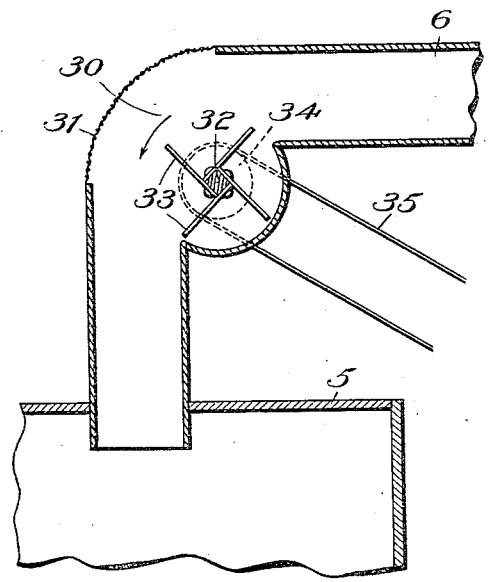
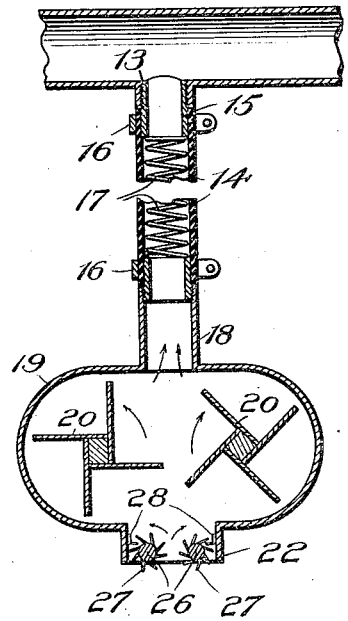
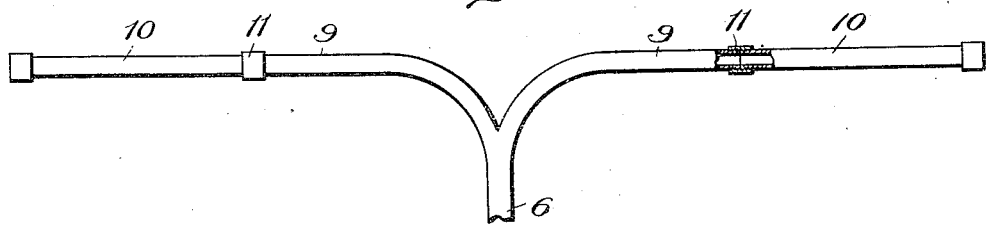
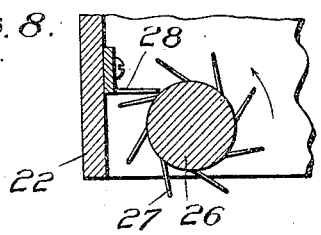

STEPHEN A. ELLIS, OF WOODLAWN, ALABAMA, ASSIGNOR OF ONE-TENTH TO W. B. COPELAND, OF BIRMINGHAM, ALABAMA.

COTTON-HARVESTING APPARATUS.

No. 869,888.　　　　Specification of Letters Patent.　　　　Patented Nov. 5, 1907.

Application filed December 15, 1906. Serial No. 348,025.

*To all whom it may concern:*

Be it known that I, STEPHEN A. ELLIS, a citizen of the United States, residing at Woodlawn, in the county of Jefferson and State of Alabama, have invented new and useful Improvements in Cotton-Harvesting Apparatus, of which the following is a specification.

My invention relates to improvements in cotton harvesting machinery in which the cotton is gathered by suction and is conveyed to a gin where it is ginned and packed into bales or sacks, the machinery being mounted on a wagon adapted to be drawn by an ordinary team.

One object of my invention is to extend the pneumatic conveyer tube forward of the wagon and beyond the team where it is provided with an extensible cross-head carrying a plurality of suction tubes which hang down in front of the team and across any desired number of rows. The conveyer tube is supported near its outer end from the wagon tongue and may also be provided with hand supports at each end of the extended cross-head.

A further object of my invention is to provide novel devices for picking and drawing the cotton into the suction tubes, these devices preferably comprising a pair of rotary pickers carrying grabs and driven by a pair of fans located in the suction head of each tube and driven by the action of the air flowing therethrough.

A further object of my invention is to provide a means for cleaning the cotton and removing sand and foreign matter therefrom before discharging it into a sack or gin. This I effect by means of an air blast and screen in connection with a rotary beater which acts to open up the cotton and loosen the foreign matter clinging thereto, so that the air blast will blow the same through the screen.

My invention further comprises the details of construction and arrangement of parts hereinafter more particularly described and claimed in the accompanying drawings, in which:—

Figure 1, is a side view of a cotton picking apparatus complete. Fig. 2, is a front view of part of said cross-head with the suction tubes depending therefrom. Fig. 3, is a vertical sectional view through the suction head and tube. Fig. 4, is a front view of said suction head. Fig. 5, is a vertical sectional view through the picker head and suction tube. Fig. 6, is a detail plan view of the extensible cross-head. Fig. 7, is a detail view of the cotton cleaning devices. Fig. 8, is a detail view of one of the rotating picker cylinders and its stationary comb.

Similar reference numerals refer to similar parts throughout the drawings.

As illustrated, I mount an ordinary gasolene engine or motor 1 upon a wagon body and connect it by a belt 2 to a fan 3 and by a belt 4 to a gin 5. These parts may be of any desired construction. The fan acts to exhaust the air rapidly from a conveyer tube 6 made of metal so as to be light but strong. The conveyer 6 extends forward of the wagon, beyond the tongue 7 and ahead of the team. A rod 8 supports and braces the outer end of the conveyer tube from the wagon tongue. At its forward end the tube 6 is connected by a Y-bend to the cross-heads 9 threaded at their outer ends which are normally closed by screw caps. When it is desired to extend either cross-head so as to cover a larger number of rows, extension tubes 10 may be connected thereto by coupling sleeves 11, the tubes being closed at their outer end and provided with a supporting rod 12 which may be carried in the hands of the outside operators which are handling the cotton picking devices.

The cross-heads 9 and extension tubes 10 are provided with a plurality of openings 13 in their under sides with each of which openings a flexible suction tube 14 is adapted to be connected by a threaded nipple 15 and a clamp 16, the nipple being screwed into an opening 13. These tubes are preferably formed of some hard, durable, elastic material and are strengthened against collapse by coiled springs 17. At their lower ends these tubes are connected to handle portions 18 of the picker heads or casings 19 in the same manner in which they are connected to the cross-head. These picker heads comprise a casing enlarged near the handle portion so as to receive a pair of blade fans 20 which rotate on axes 21 journaled in the sides of the casing. The blades of these fans are of such length that they project into the path of the air flowing through the extension end or mouth piece 22 of the head and enter the tubes. This blast of air serves to continuously turn the fans in the direction of the arrows, and by means of pulleys 23 disposed without the casing and belts 24, the fans transmit motion to pulleys 25. The pulleys 25 are mounted on shafts journaled at the outer ends of the mouth piece 22. These pulleys drive picker cylinders 26 provided with a plurality of tangentially disposed grabs 27 which project without the mouth piece, as seen in Fig. 5, so that they will catch and draw the cotton into the mouth piece where the suction action of the air blast will carry it between the cylinders and fans and through the tube 6. The tangential disposition of the grabs enables the air blast to readily disengage the cotton therefrom. To prevent the possible accumulation of cotton in the grabs, a toothed comb 28 may be provided for each cylinder 26 and fastened to the inner wall of the mouth piece 22.

In operation, when the fan 3 is operated to produce the desired suction in the tubes 6 and 14, the operator presents the picking heads to the cotton bolls preferably grasping a picker head in each hand and walking between two rows. When the cotton is loose in the pod, the suction alone will be sufficient to draw it into the suction head, but when the cotton is not so loose, the grabs of the picker cylinders will catch it and free it of the pod so that the suction will then take effect. The operators walk in front of the team which therefore can do no harm to the cotton and it is obvious that any number of rows may be picked by simply extending the cross-heads and providing a fan of sufficient power. As the cotton is picked it is carried, as in the case of a pneumatic conveyer, through the tube 6 to the bend 29 therein where I provide a cleaning chamber
30. This chamber is provided at its outer periphery with a curved screen 31, against which the cotton is driven by the blast of air. In the inner periphery of the chamber I provide a recess for the reception of a stirrer device comprising a rotating shaft or cylinder 32 provided with a plurality of arms 33 fixed thereto. These arms are caused to revolve in the direction of the movement of the cotton, i. e., towards the gin or discharge end of the conveyer. This rotary stirrer is connected to a pulley 34 driven by an extension belt 35 from the fan. The arms 33 pass through the cotton and stir and open it up so that the air blast tends to blow the sand, grit, and other foreign substance through the screen while the cotton drops by gravity, as well as by the action of the air blast and the arms 33, down into the gin. From the gin the cotton may be discharged into a sack 36 supported by a frame 37 fixed to the wagon, or the cotton may be directly discharged from the conveyer into these sacks.

By this means I provide a comparatively simple apparatus which may be applied to any farming wagon and which will enable the cotton to be readily picked and ginned in the field.

Having thus described my invention, what I claim as new and desire to secure by Letters Patent, is: —

1. Cotton harvesting apparatus comprising a wagon, a motor supported thereby, a fan driven by said motor, draft devices for the wagon, a pneumatic conveyer tube extending forward of the wagon and supported at its outer end by said devices, a plurality of flexible suction picking tubes connected to the outer end of said conveyer tube, a screen in said conveyer tube, and a gin carried by said wagon and driven by said motor which receives the cotton from said tube, substantially as described.

2. In a portable cotton harvesting apparatus, a wagon, a tongue therefor, a pneumatic conveyer tube supported by said wagon and tongue, means to produce a suction in said tube, a cross-head at the outer end of said tube, and a plurality of flexible suction tubes depending from said cross-head.

3. In a cotton harvesting apparatus, a flexible suction tube, a picker head connected thereto and comprising a mouth piece containing rotating devices carrying grabs which project from said mouth piece, fans mounted in said head and adapted to be driven by the air blast flowing through said mouth piece, driving connections between said fans and grab devices, and means to produce a suction in said tube which co-acts with said devices in drawing cotton into the tube.

4. In a cotton harvesting apparatus utilizing a pneumatic conveyer system, flexible picking tubes in which the suction takes effect, picking heads carried by said tubes and comprising each a casing having a mouth-piece, fans journaled in said casing and inclosed thereby so that their blades are acted upon only by the air blast flowing from said mouth-piece into the tube, rotating grab devices mounted in or near the mouth-piece, and belt and pulley drive connections between said fans and devices.

5. In a cotton harvesting apparatus utilizing a pneumatic conveyer system, flexible picking tubes in which the suction takes effect, picking heads carried by said tubes and comprising each a casing having a mouth-piece, fans journaled in said casing and inclosed thereby so that their blades are acted upon only by the air blast flowing from said mouth-piece into the tube, rotating grab devices mounted in or near the mouth-piece, and belt and pulley drive connections between said fans and devices, and disposed without the casing.

6. A portable cotton harvesting apparatus, comprising a power driven fan, a pneumatic conveyer tube, a plurality of flexible suction picking tubes connected to and adapted to feed said conveyer tube, a screen in said conveyer tube, and a power driven rotary stirrer device adapted to act on the cotton at a point adjacent to said screen.

7. A portable cotton harvesting apparatus, comprising a power driven fan, a pneumatic conveyer tube, a plurality of flexible suction picking tubes connected to and adapted to feed said conveyer tube, and a cleaning chamber into which said conveyer discharges the cotton, said chamber comprising a rotary stirrer, and a screen disposed at a bend in said conveyer tube.

In testimony whereof I have hereunto set my hand in presence of two subscribing witnesses.

STEPHEN A. ELLIS.

Witnesses:
NOMIE WELSH,
GEORGE W. YANCEY.